(12) United States Patent
Gaedke et al.

(10) Patent No.: US 7,656,982 B2
(45) Date of Patent: Feb. 2, 2010

(54) DSP-BASED DATA RECOVERY

(75) Inventors: Klaus Gaedke, Hannover (DE); Friedrich Timmermann, Garbsen (DE); Axel Kochale, Springe (DE); Ralf-Detlef Schaefer, Celle (DE); Herbert Schütze, Celle (DE); Marten Kabutz, Villingen-Schwenningen (DE)

(73) Assignee: Thomson Licensing, Boulogne-Billancourt (FR)

( * ) Notice: Subject to any disclaimer, the term of this patent is extended or adjusted under 35 U.S.C. 154(b) by 603 days.

(21) Appl. No.: 10/556,835

(22) PCT Filed: Apr. 27, 2004

(86) PCT No.: PCT/EP2004/004406

§ 371 (c)(1),
(2), (4) Date: Nov. 15, 2005

(87) PCT Pub. No.: WO2004/102564

PCT Pub. Date: Nov. 25, 2004

(65) Prior Publication Data

US 2007/0064847 A1    Mar. 22, 2007

(30) Foreign Application Priority Data

May 16, 2003   (EP) ................................. 03010998

(51) Int. Cl.
*H04L 7/04* (2006.01)
*H04L 7/00* (2006.01)
(52) U.S. Cl. ...................... 375/362; 375/354
(58) Field of Classification Search ................. 375/362, 375/354; 327/141; 358/409
See application file for complete search history.

(56) References Cited

U.S. PATENT DOCUMENTS

| | | | | |
|---|---|---|---|---|
| 4,347,618 A * | 8/1982 | Kavouras et al. | ............ | 375/259 |
| 4,641,364 A * | 2/1987 | Bass et al. | .................. | 340/7.2 |
| 6,507,299 B1 * | 1/2003 | Nuijten | ...................... | 341/143 |
| 6,788,753 B1 * | 9/2004 | Brown | ........................ | 375/368 |
| 6,826,245 B1 * | 11/2004 | Brown et al. | ................ | 375/368 |
| 2002/0045461 A1 * | 4/2002 | Bongfeldt | ................... | 455/522 |
| 2002/0190203 A1 * | 12/2002 | Valaskovic et al. | ......... | 250/288 |
| 2003/0151988 A1 * | 8/2003 | Katayama | ............... | 369/44.32 |

(Continued)

FOREIGN PATENT DOCUMENTS

EP    1150291    10/2001

(Continued)

OTHER PUBLICATIONS

Patent Abstracts of Japan, vol. 2002, No. 12, Dec. 12, 2002 & JP 2002-216424 (See Ref. AA).

(Continued)

*Primary Examiner*—David C Payne
*Assistant Examiner*—Brian J Stevens
(74) *Attorney, Agent, or Firm*—Robert D. Shedd; Paul P. Kiel; Guy H. Eriksen

(57) ABSTRACT

A bit clock recovery apparatus for digital storage readout employing sync frames, where an oversampled readout signal is stored in memory, sync patterns are located in the signal using DSP means, distances of consecutive sync pattern locations are calculated, and bit clock is recovered from these distances and the knowledge about the data framing structure.

3 Claims, 3 Drawing Sheets

U.S. PATENT DOCUMENTS

2003/0176937 A1 * 9/2003 Janky et al. .................. 700/94

FOREIGN PATENT DOCUMENTS

| JP | 08-007468 | | 1/1996 |
|---|---|---|---|
| JP | 2001-266493 | | 9/2001 |
| JP | 2002 216424 | * | 8/2002 |
| JP | 2002-216424 | | 8/2002 |

OTHER PUBLICATIONS

Patent Abstracts of Japan, vol. 1996, No. 05, May 31, 1996 & JP 8-007468 (See Ref. AB).
Patent Abstracts of Japan, vol. 2000, No. 26, Jul. 1, 2002 & JP 2001-266493 (See Ref. AC).
Search Report dated Jul. 23, 2004.

* cited by examiner

DSP-BASED DATA RECOVERY

FIELD OF THE INVENTION

The invention relates to the data acquisition in digital storage media readout.

BACKGROUND

Information readout from digital storage media with moving parts always involves the task of recovering the bit clock from the incoming time-continuous readout signal. Only with a reliably known bit clock can the readout signal be converted into a sequence of bits, and thus be ready for subsequent time-discrete, fully digital processing.

Additionally, whenever a specific storage media format foresees to group information into a repetitive pattern of data frames of predefined layout, also denoted as sync frames, the alignment of the data relative to this pattern has to be recovered. This is also denoted as sync frame alignment recovery. A related task, especially important during random access, is to verify from the read data which of the frames currently is being read, which is also denoted as readout address recovery. Sync frame alignment recovery and readout address recovery are made possible if e.g. every sync frame begins with a dedicated sync pattern and this sync pattern is additionally suffixed with an address information. The sync pattern together with the subsequent address information often is denoted as sync code. For the example of the CD format, the sync pattern is an 11T/11T signal, which is dedicated in so far as it surpasses, for the mark as well as the space, the 10T runlength limitation of pits containing ordinary data. Similar approaches are used for other optical media formats.

Additionally, whenever a storage media readout device is compliant to more than one storage media types or formats, the device has to recognize the media type at an early stage after media insertion, in order to be able to perform any subsequent data handling in accordance with the specification(s) relevant for that specific type of media.

PROBLEM TO BE SOLVED

A known approach for bit clock recovery is a Phase-Locked Loop (PLL); in case of digital optical media like Compact Disk (CD), a digital PLL can be employed. Implementation of a PLL always consumes power and silicon area; after media insert, PLL-based signal recovery has to wait for the PLL to be locked.

It is thus the aim of the present invention to provide a method and apparatus which realize the required functions of bit clock recovery, sync frame alignment recovery, readout address recovery and media type recognition in a way which avoids a PLL altogether.

An apparatus according to the present invention performs one or more of the following functions:
To recognize the type of media that is being accessed,
To recover the bit clock during digital storage readout,
To recover the sync frame alignment of the data,
To decode, as early as possible, addressing information contained in the data,
To convert a readout signal to a bit sequence employing the correct bit clock.

The invention is advantageously-applicable in other fields of digital technology like receiving digitally transmitted signals.

According to this invention, data recovery is performed using the following steps in sequence:
a) A sequence of A-to-D-converted samples representing an oversampled readout signal from the storage medium is stored in a memory.
b) The stored sample sequence is scanned for occurrences of one or more predefined sync patterns. The positions of found occurrences are memorised as sync positions. One way to realize this scanning is a cross-correlation algorithm.
c) The distance between consecutive sync positions is measured.
d) From the distance of sync positions and the known sync frame structure, the base frequency of the samples is calculated. From the sync positions and the base frequency, a bit clock is regenerated.
e) Using the regenerated bit clock, the sample sequence from memory is sample rate converted into a new sequence, which represents the readout signal when sampled at the correct bit clock rate.

This has the general advantage that the power and area consuming implementation of a sophisticated and complex digital PLL is conceptually avoided.

Advantageously, data recovery according to this invention may additionally include the following step:
Whenever an occurrence of a sync pattern has been found, the associated sync code is decoded by a pattern recognition algorithm.

This has the advantage that sync codes are detected and the position of the read unit is determined at a very early stage in signal processing. Any PLL locking is not required. Hence the sync code decoding step proposed in the invention is very fast, which is advantageous during random access mode.

Also, advantageously, data recovery according to this invention may additionally include the following step:
From the distance between consecutive sync positions and the knowledge about which type of sync pattern has been found, recognize the format of the storage media (e.g. CD, DVD).

This has the advantage to constitute a very reliable media recognition, because it is exclusively based on details of the physical recording format that are fixed. It does not rely upon storage media material properties, which may vary. In case of optical disks, the reflectivity is known to vary across media brands and even across manufacturing lots; hence a media recognition based on reflectivity measurement is error prone. Another advantage is that, being located in very early stages of signal processing, the described media recognition is considerably faster than any methods based on evaluating disk reflectivity and/or focus position.

The present invention provides the following advantages:
The proposed algorithms to recover the data from a set of samples can easily be adapted, even during operation, to the type of optical media, the applied channel modulation method and the actual drive speed. Therefore, it is possible to use different algorithms for each type of media in order to reduce the bit-error-rate of the read channel.

It is even possible to first detect, using concepts of this invention, the type of media, and then to switch to one of a set of optimised algorithms of this invention for bit clock recovery and/or sync alignment.

In this way, the invention offers improved flexibility in handling different media.

With other words, the invention describes a data recovery method and apparatus for digital storage readout employing sync frames, where an oversampled readout signal is stored in memory, sync patterns are located in the signal using DSP means, distances of consecutive sync pattern locations are calculated, bit clock is recovered from these distances and the knowledge about the data framing structure, and data is converted to bit sequences which represent the readout signal when sampled at the correct bit clock.

EXEMPLARY EMBODIMENTS

Bit clock recovery is one of the main problems for the implementation of an acquisition path of digital storage readout devices. Main target of the clock recovery is the determination of the actual channel bit rate from a sampled time-continuous read signal. This clock recovery has to deal with a wide range of channel bit rates because of different media (CD, DVD) and different read speeds. Today, the channel bit rate varies from 4.12 Mbit/s (CD 1×) to 400 Mbit/s (DVD 16×). In the near future, 500 Mbit/s for DVD 20× have to be expected.

Most optical discs are recorded or pre-recorded with a constant linear velocity (CLV) mode. This implies that for a nominally constant channel bit rate, a higher rotational speed is required when reading near the inner radius of the data area, and a lower rotational speed at the outer radius, and that rotational speed must be adapted whenever the readout radius changes. Because rotation speed adaptation is never perfect or instantaneous, momentary channel bit rate will vary during read of the entire disc and after jumps from one sector to another.

Figure 1:
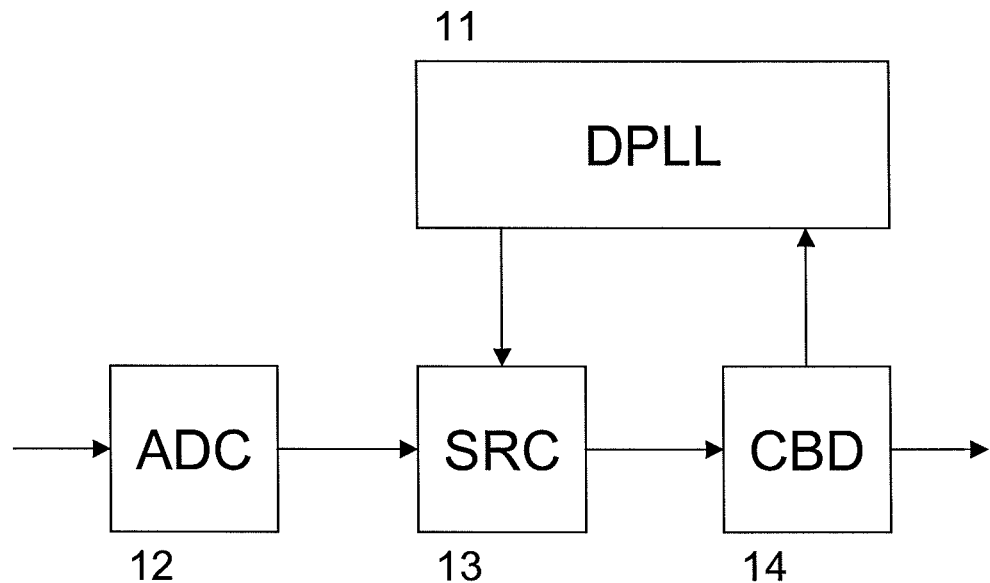
FIG. 1 shows in block diagram form the known approach for clock recovery.

FIG. 1 shows the known approach for data recovery. This approach is based on an Analog to Digital Converter 12, a digital PLL 11, a Sample Rate Converter 13, and the Channel Bit Decoding unit 14. The digital PLL 11 is used to derive the actual channel bit rate and a phase information from the samples of the analogue signal. Because this PLL has to lock to a wide range of bit clock rates and various different bit patterns with various different modulations for CD and other optical media, the implementation of this PLL is a very sophisticated and complex task. Main input signal for the digital PLL is a phase information from the channel bit decoding unit. The digital PLL is locked if this signal becomes zero.

The SRC 13 uses the signals from the digital PLL 11, namely frequency and phase information, to convert the physical samples into virtual ones, which correspond to the actual channel bit rate.

Figure 2:
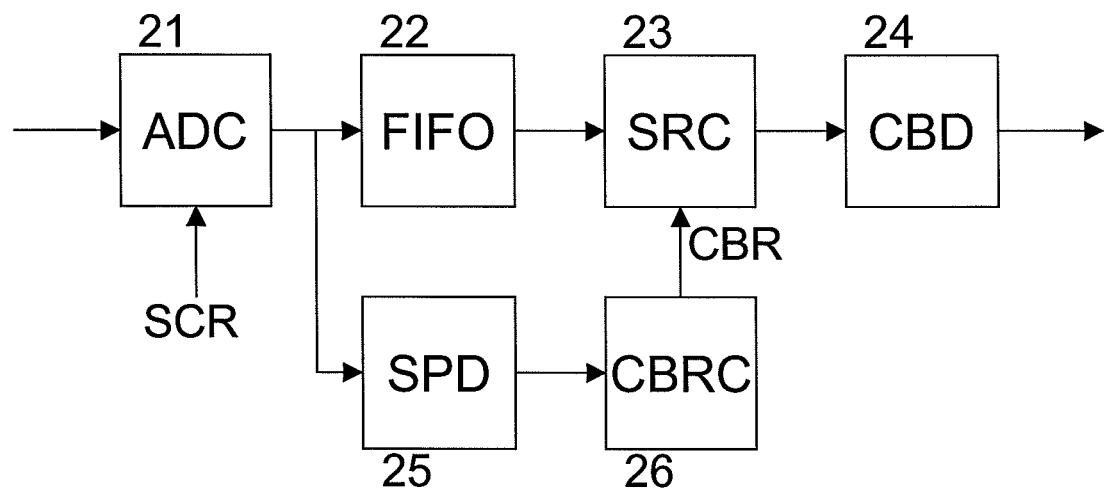
FIG. 2 shows in block diagram form an implementation of clock recovery and sample rate conversion according to the invention.

FIG. 2 shows an implementation of clock recovery and sample rate conversion according to the invention. First, a number of n consecutive samples from the ADC 21 are stored in a FIFO 22. Same as with the known approach described above, the sample rate of the ADC 21 has to be at least equal to the maximum channel bit rate, as taught by Shannon's sampling theorem. The size of the FIFO 22 should be large enough to store all samples between and including two consecutive sync patterns.

In a side branch consisting of a Sync Pattern Detector 25 and a Channel Bit Rate Calculator 26, the actual channel bit rate for this set of samples is determined by the measurement of the distance between two consecutive sync patterns. In one form or other, such sync patterns exists for all optical storage media. Because the expected sample sequence for the sync pattern is known in advance, the required sync pattern detection 25 can be based on algorithms like cross-correlation. From the distance between consecutive sync patterns, channel bit rate calculation 26 calculates the actual channel bit rate of the samples stored in the FIFO 22. In a third step, the samples are converted to the calculated channel bit rate by the sample rate conversion unit 23 e.g. based on an interpolation algorithm. Based on these converted samples, Channel Bit Decoding 24 can then be performed.

Figure 3:
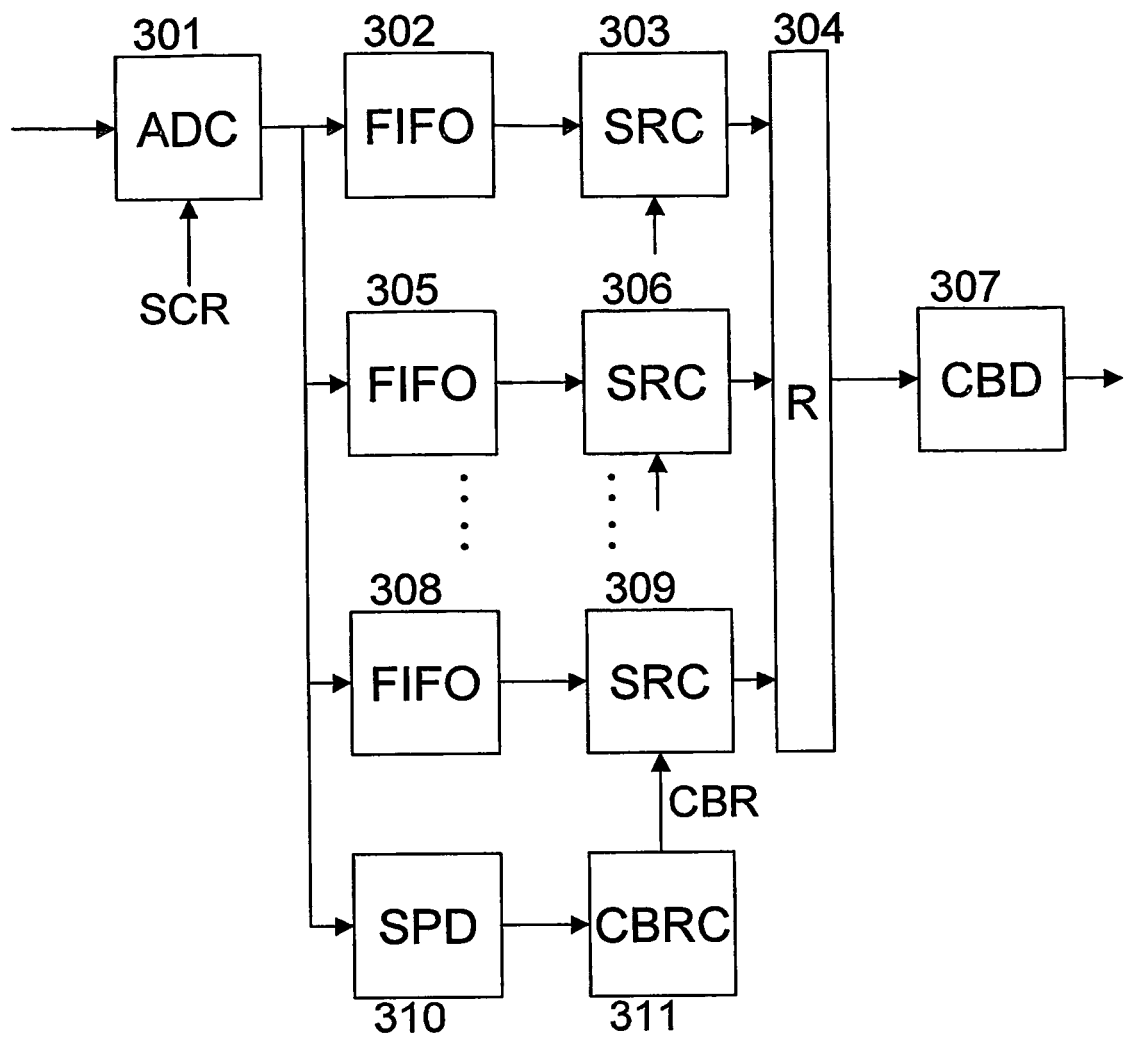
FIG. 3 shows the parallelisation approach for sample rate conversion.

FIG. 3 shows a parallelisation approach for the sample rate conversion. If implemented in an integrated circuit, this advantageously results in highly parallel hardware structures, such that high clock rates are avoided. The samples from the ADC 301 are clocked into a number of FIFOs 302, 305, 308, 310 connected to the same number of SRC units 303, 306, 309, 311. Because every SRC unit 303, 306, 309, 311 now has to handle only every n-th set of samples, the throughput constraints are relaxed significantly. This results in a lower clock speed for the SRC units. Because the input FIFO processing speed is independent of the sample rate of the ADC, the SRC units can be clocked independently from the ADC. This is an advantage for high speed drives, were clock rates up to 300 MHz for the ADC are required. If channel bit rate calculation and sample rate conversion are designed to handle 4 samples per clock, the required clock speed for these units would be 75 MHz only.

After the determination of the length of the sync codes (measured in number of HF samples) and the distance of two consecutive sync codes (also measured in number of HF samples), the length of a channel bit in the HF signal is also known in terms of HF samples.

Figure 4:
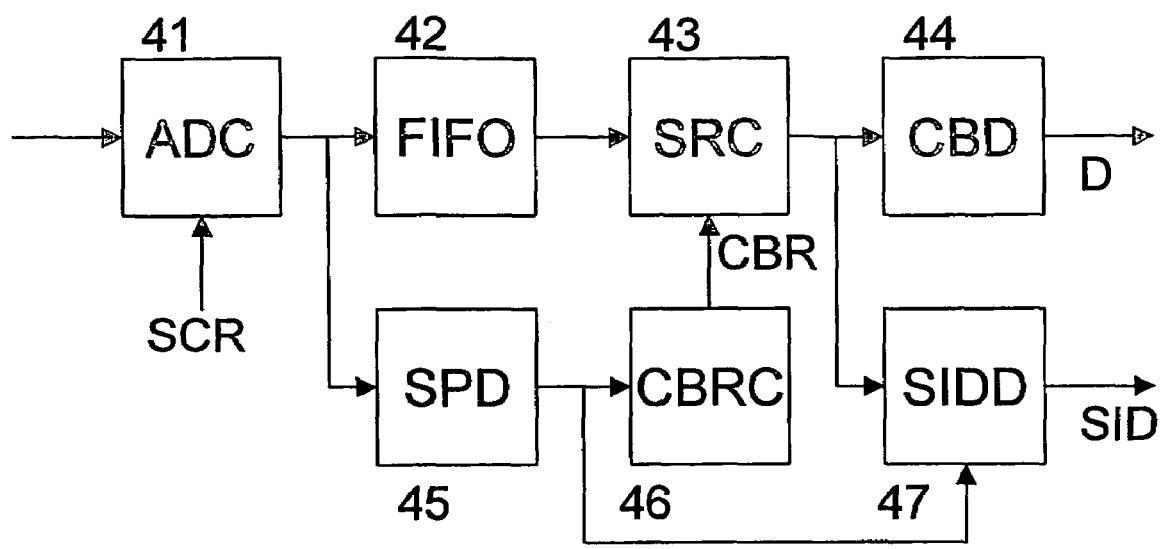
FIG. 4 shows in block diagram form the required enhancements to implement Sync ID decoding according to the invention.

FIG. 4 shows the block diagram of a scheme for readout address recovery. Same as in channel bit clock recovery, a readout signal is digitised 41 and stored in a FIFO 42, and the unique portions of the sync codes, namely the sync patterns, are detected 45. Then, specifically, the information from the sync pattern detection 45, mainly the position information, is used for a simple decoding 47 of the non-unique portion of the sync codes. This decoding is based either on the HF signal (not shown) with the advantage that this signal is available early in the processing path, or on the resampled signal (48) with the advantage that there, due to the resampling, the non-unique portion of the sync codes is available in a temporally standardised form which may contribute to simplify the decoding task. Because only a limited set of valid sync code exists for each format, a maximum likelihood decoder may be applied.

In a favourable extension, media recognition, too, is achieved based on cross correlation: First, the cross correlator is programmed for the detection of a specific type of sync codes. This is an 11T/11T signal for the example of CD. The possible range of the length of the sync codes is known from the current speed of the drive and the assumed format. A search for sync codes is then performed, e.g. an exhaustive search starting with the maximum possible sync code length and stepwise refining the cross correlator programming down to the minimal possible length. Media recognition is considered successful as soon as periodic sync codes are detected, i.e. as soon as a fixed distance is found between any two consecutive sync codes. If no periodic sync codes are detected throughout the complete search, the media does not comply to the media type of the sync code under investigation, the cross correlator has to be reprogrammed for the detection of another type of sync codes and the above described procedure has to be repeated.

The invention claimed is:

1. A method for data recovery from a time-continuous signal compliant to one of two or more digital signal formats each having a specific channel bit clock and a specific sync pattern occurring in regular intervals, the method comprising:
   sampling the time-continuous signal at a frequency at least as high as a maximum of all frequencies of the channel bit clocks of the digital signal formats;
   analysing the sampled signal to locate occurrences of one or more of the sync patterns, thereby making available, as an analysis information, where in the sampled signal which ones of the sync patterns are located;
   calculating from the analysis information a distance information about the distance between consecutive locations of sync patterns;
   recognizing, from the analysis information and the distance information, the one digital signal format among the two or more digital signal formats to which the signal complies,
   converting the sampled signal into a converted signal which represents the data at the channel bit clock;
   analysing, after recognizing the format to which the signal complies, with an algorithm that depends on the recognized format, the sampled signal to locate occurrences of one or more predefined sync patterns, thereby making available analysis information about where in the sampled signal which ones of the sync patterns are located;
   calculating, with an algorithm that depends on the recognized format, from the analysis information a distance information about the distance between consecutive locations of sync patterns;
   calculating, with an algorithm that depends on the recognized format, from the analysis information and/or the distance information a channel bit rate and/or the channel bit clock;
   converting, with an algorithm that depends on the recognized format, the sampled signal to the sampling rate defined by the calculated channel bit rate or bit clock.

2. A method for data recovery from a time-continuous signal compliant to one of two or more digital signal formats each having a specific channel bit clock and a specific sync pattern occurring in regular intervals, the method comprising the following steps:
   sampling the time-continuous signal at a frequency at least as high as a maximum of all frequencies of the channel bit clocks of the digital signal formats;
   analysing the sampled signal to locate occurrences of one or more of the sync patterns, thereby making available, as an analysis information, where in the sampled signal which ones of the sync patterns are located;
   calculating from the analysis information a distance information about the distance between consecutive locations of sync patterns;
   recognizing, from the analysis information and the distance information, the one digital signal format among the two or more digital signal formats to which the signal complies,
   converting the sampled signal into a converted signal which represents the data at the channel bit clock
   wherein the analysing step involves the following sub-steps
   a) setting as a current sync pattern a first sync pattern from a finite set of different sync patterns,
   b) analysing the sampled signal to find positions of the current sync pattern,
      b1) setting as a current sync pattern version a first stretched version from a finite set of differently stretched versions of the current sync pattern,
      b2) analysing the sampled signal to find positions of the current sync pattern version,
      b3) if no positions are being found and the last current sync pattern version has not been reached, setting as the current sync pattern version the next sync pattern version from the set and looping back to sub-step b2; and
   c) if no positions are being found and the last sync pattern in the set has not been reached, setting as the current sync pattern the next sync pattern from the set and looping back to sub-step b.

3. An apparatus for recovering a channel bit clock from a time-continuous signal compliant to one of two or more digital signal formats each having a specific channel bit clock and a specific framing structure including a specific sync pattern occurring in regular intervals, the apparatus including
   sampling means which generate a sampled signal from the time-continuous signal,
   analogue to digital conversion means connected to the sampling means and
   sample rate conversion means; the apparatus comprising
   an analyser adapted to analyse the sampled signal to locate occurrences of one or more of the sync patterns, thereby making available, as an analysis information, where in the sampled signal which ones of the sync patterns are located,
   a calculator adapted to calculate from the analysis information a distance information about the distance between consecutive locations of sync patterns; and to calculate a channel bit rate and/or the channel bit clock from the analysis information, and
   a format recogniser adapted to recognise, from the analysis information and the distance information, the signal format to which the signal complies, wherein the sample rate conversion means convert its input data to output data obeying an output sample rate equal to the channel bit rate or bit clock as calculated by the calculator,
   additionally including a sync ID decoder triggered by the analyser having located a sync pattern occurrence, the sync ID decoder decoding the sync IDs from the sample rate converted digitised signal.

* * * * *